Oct. 9, 1923.
S. B. CLAY
1,470,256
BLANK HOLDER AND EJECTING DEVICE FOR BOLT MACHINES
Filed June 11, 1921 2 Sheets-Sheet 1
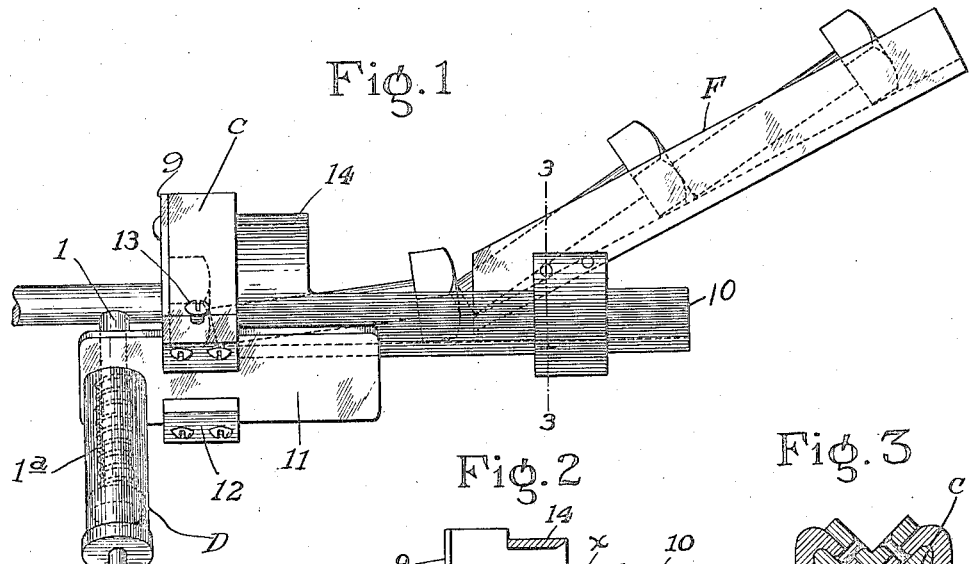
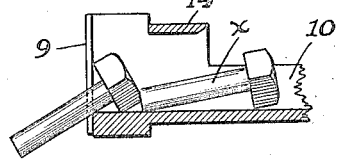
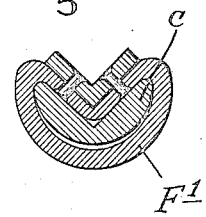
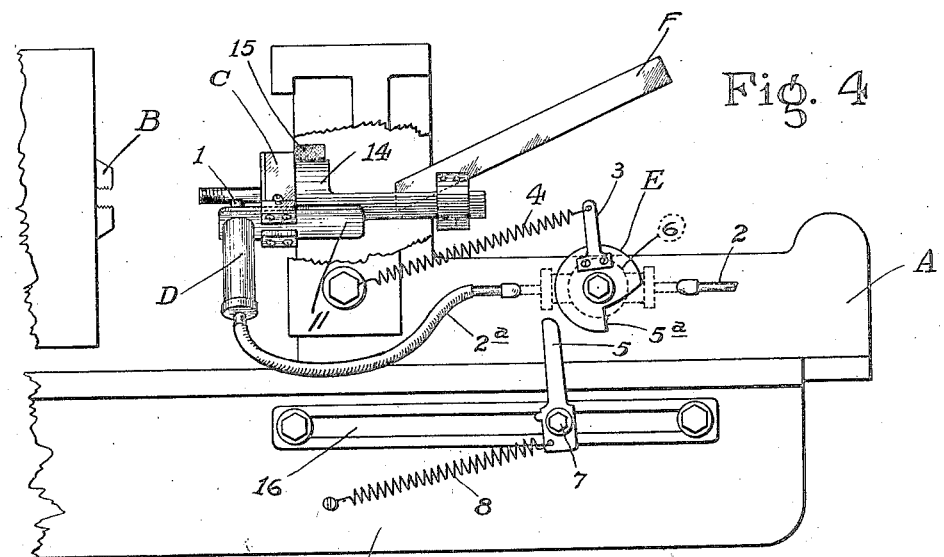
INVENTOR
Samuel B. Clay
BY Bakewell & Burel
ATTORNEYS Oct. 9, 1923.
S. B. CLAY
1,470,256
BLANK HOLDER AND EJECTING DEVICE FOR BOLT MACHINES
Filed June 11, 1921  2 Sheets-Sheet 2
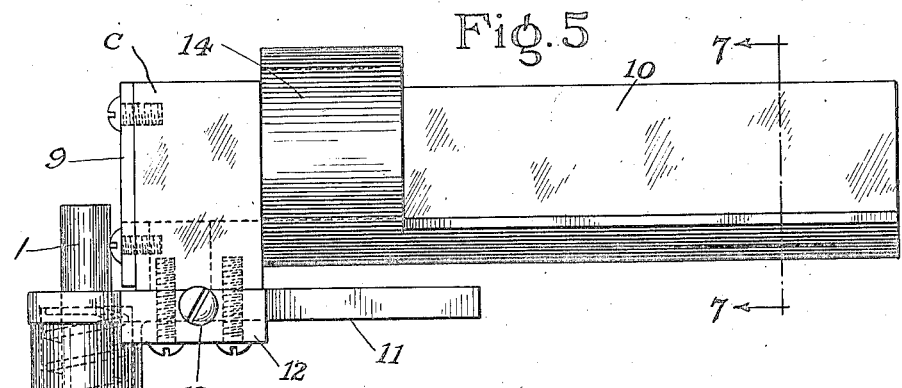
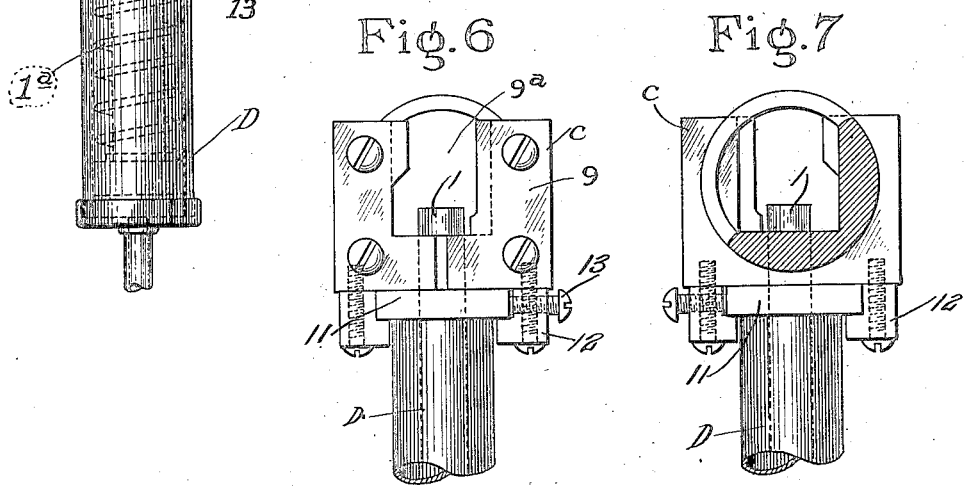
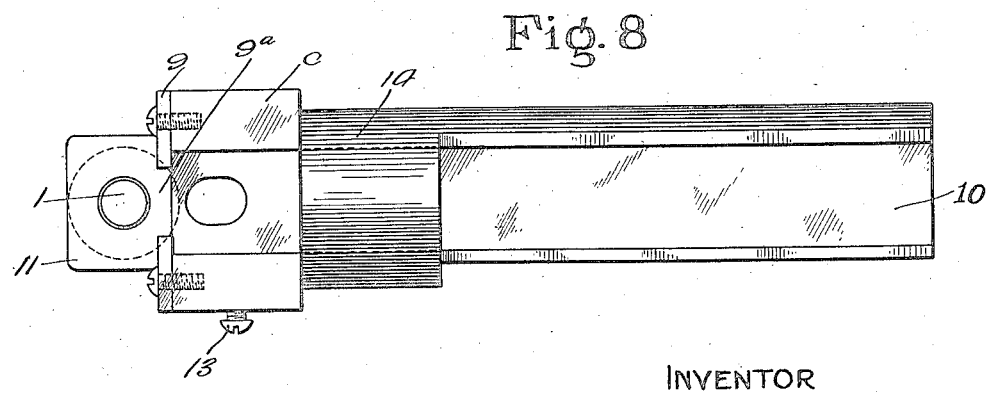
INVENTOR
Samuel B. Clay
BY Bakewell & Church
ATTORNEYS Patented Oct. 9, 1923.

1,470,256

UNITED STATES PATENT OFFICE.

SAMUEL B. CLAY, OF ST. LOUIS, MISSOURI.

BLANK HOLDER AND EJECTING DEVICE FOR BOLT MACHINES.

Application filed June 11, 1921. Serial No. 476,879.

*To all whom it may concern:*

Be it known that I, SAMUEL B. CLAY, a citizen of the United States, residing at St. Louis, Missouri, have invented a certain new and useful Improvement in Blank Holders and Ejecting Devices for Bolt Machines, of which the following is a full, clear, and exact description, such as will enable others skilled in the art to which it appertains to make and use the same.

This invention relates to machines of the kind that are used for threading, pointing or performing other operations on bolt blanks and other objects that are adapted to be supported in a holder during the threading or machining operation and removed from the holder at the completion of the threading or machining operation.

The main object of my invention is to increase the speed of operation of bolt threading machines and machines of a similar nature.

Another object is to provide a blank holder for bolt machines and similar machines which overcomes the necessity of clamping each blank or article prior to the machining operation and releasing the blank at the completion of the machining operation.

Another object is to provide an automatic ejecting device for bolt machines and other machines of a similar character that will discharge the bolts rapidly and accurately.

Another object is to provide a blank holder of the kind referred to that can be adjusted quickly and easily to adapt it to bolt blanks or other articles of different lengths.

And still another object is to provide an automatic ejecting device for bolt machines that is of simple design, inexpensive to manufacture and install and of such construction that it can be changed easily to adapt it to long and short bolt blanks.

Figure 1 of the drawings is a side elevational view of a bolt blank holder and automatic ejecting device constructed in accordance with my invention.

Figure 2 is a longitudinal sectional view of the holder.

Figure 3 is a vertical transverse sectional view, taken on the line 3—3 of Figure 1.

Figure 4 is a side elevational view of a portion of a bolt threading machine equipped with a blank holder and automatic ejecting device constructed in accordance with my invention.

Figure 5 is an enlarged side elevational view of the blank holder and the cylinder of the ejecting device with the holder arranged at such an angle as to show one of the angularly-disposed, flat faces on the inner side of same that co-operates with the head of the bolt blank to hold the blank in a certain position when it is being fed longitudinally through the holder.

Figure 6 is an end elevational view of the parts shown in Figure 5.

Figure 7 is a vertical cross sectional view, taken on the line 7—7 of Figure 5, looking in the direction indicated by the arrows; and Figure 8 is a top plan view of the blank holder and the cylinder of the ejecting device, with the holder arranged at such an angle as to show the slotted plate at the front end of same through which the shank of the end bolt blank projects forwardly.

I have herein illustrated my invention embodied in a blank holder and ejecting device for bolt threading machines of the kind that comprises a reciprocating carriage A that is adapted to move longitudinally in one direction so as to cause a bolt blank on the carriage to be engaged by a threading mechanism B and moved longitudinally in the opposite direction back to its normal position at the completion of the threading operation. I have not illustrated the means that is used for reciprocating the carriage A, as said means does not form part of my present invention. Furthermore, while I have herein illustrated my invention embodied in a bolt machine of the type in which the bolt blanks are adapted to be mounted on a reciprocating carriage, I wish it to be understood that it is immaterial how the work is engaged with the threading mechanism of the machine or how the threading mechanism and work are separated at the completion of the threading operation.

As shown in Figure 4, the carriage A of the machine is equipped with a blank holder designated as an entirety by the reference character C and arranged in such a manner that it will hold a bolt blank in a horizontal position in longitudinal alignment with the threading mechanism B of the machine, The carriage A is also equipped with an automatic ejecting device which preferably consists of a cylinder D arranged in proximity to the front end of the holder C and provided with a plunger 1 that strikes against the finished bolt or end blank in the holder C, and thus automatically ejects said bolt when a fluid operating medium, such as compressed air, is admitted to the cylinder D. Various means may be used for actuating the plunger 1 of the ejecting device, but I prefer to use a coiled spring $1^a$ for normally holding the plunger 1 retracted and admit compressed air to the cylinder D by a three-way valve E that is arranged between a supply pipe 2 and a pipe $2^a$ that leads from the casing of said valve to one end of the cylinder D, as shown in Figure 4. The stem of the valve E is provided with an arm 3 that is acted upon by a spring 4 which normally holds said valve closed, thus cutting off communication between the cylinder D and the supply pipe 2, and means is provided for opening the valve E automatically when the carriage A reaches or is near the end of its return stroke at the completion of the threading operation, the means herein illustrated for this purpose consisting of a dog 5, which, on the return stroke of the carriage A, strikes against a shoulder $5^a$ on a part 6 that is connected to the arm 3 on the stem of the valve E, and thus opens the valve so as to permit a charge of compressed air to enter the cylinder D and actuate the plunger 1 of the ejecting device, the spring 4 causing the valve to close as soon as the part 6 has passed out of engagement with the dog 5. The dog 5 is acted upon by a spring 8 that normally holds it in an upright position, as shown in Figure 4, and said dog is pivotally mounted on a stud 7 in such a way that the upper end of said dog will swing to the left when it is engaged by the part 6 on the forward stroke of the carriage. During the forward stroke of the carriage A to feed the bolt blank into position to be acted upon by the threading mechanism B a curved surface on the part 6 that is connected to the stem of the valve E engages the upper end of the dog 5 and depresses said dog sufficiently to permit the part 6 to move forwardly beyond said dog, the spring 8 restoring the dog 5 to its normal upright position as soon as the upper end of same has passed out of engagement with the part 6. On the return stroke of the carriage A, namely, to the right (looking at Figure 4), the shoulder $5^a$ on the part 6 engages the dog 5, and as said dog is mounted in such a manner that it cannot swing to the right, it acts as a stop or tripping device which turns the part 6 in a direction to open the valve E, the spring 4 operating to return the part 6 to its normal position, and thus closing the valve E as soon as the shoulder $5^a$ passes out of engagement with the upper end of the dog 5 during the return stroke of the carriage.

The blank holder C consists of a substantially horizontally-disposed member mounted on the carriage A and provided with a channel or center guideway in which one or more bolt blanks $x$ can be arranged longitudinally or lengthwise of the holder C, as shown in Figure 2. At the front end of the holder C is a plate or end piece 9 provided with a slot or bifurcated portion $9^a$ shown in Figure 6 through which the shank of the end bolt blank projects forwardly from the holder, as shown in Figure 2. The particular cross sectional shape of the channel or guideway in the holder C is immaterial, so far as my broad idea is concerned, but I prefer to make said channel or guideway substantially V-shaped so that it will comprise two right-angularly-disposed, flat surfaces 10 that bear against adjacent flat surfaces on the heads of the bolt blanks. If it is desired to discharge the bolts from the holder C by throwing the bolts upwardly and laterally to one side of the carriage A, the cylinder D of the ejecting device is arranged at such an angle that the plunger 1 of said cylinder will extend in the direction in which it is desired to discharge the bolts from the holder and the slot or bifurcation $9^a$ of the end plate 9 of the holder will extend in the same direction as the plunger 1 and will be open at its outer end, as shown in Figure 6. Thus, when the cylinder D of the ejecting device is arranged in the manner shown in Figure 1, the finished bolt will be ejected from the holder by a blow from the plunger 1 which throws the bolt upwardly and also laterally from the right hand side of the machine.

To arrange the bolt blanks in operative position in the holder C it is only necessary to drop the bolt blanks in the channel or guideway of said holder with the shanks of the blanks projecting forwardly, and then feed the blanks forwardly through said guideway by pressure applied to the rear end of the blanks. If the bolt blank at the extreme front end of the holder C is lying loose in the channel or guideway of the holder, with no pressure or end thrust exerted on said blank, the shank of the blank will incline downwardly, as shown in Figure 2. As soon as the blank at the rear of the end blank is pushed forwardly, however, the thrust or forward pressure on the end blank will raise the shank of said end blank into a horizontal position in perfect longitudinal alignment with the threading mechanism B of the machine, due to the fact that the forward thrust or pressure on the end blank causes the head of same to be brought squarely up against the inner side of the slotted end plate 9 of the blank holder C with two of the adjacent oppositely-inclined, flat faces on the head of the end blank bearing against the angularly-disposed, flat faces 10 of the channel in the holder C. Accordingly, all that is necessary on the part of the operator in charge of the machine to insure proper alignment of the bolt blanks with the threading mechanism B of the machine, is to exert a forward thrust or slight forward pressure on the string of bolts in the guideway of the holder so as to hold the underside of the head of the end blank squarely against the end plate 9 which is arranged at right angles to the guideway or channel in the holder C. It is usually preferable to provide the holder C with an inclined trough or chute F of sufficient length to hold a number of bolt blanks, as shown in Figure 1, and arrange said trough in such a position with relation to the end plate 9 of the holder that there is sufficient space between the end of the trough F and the head of the end blank in the holder to receive one bolt blank, thereby causing the end of the trough F to serve as a stop or abutment to take up the rearward end thrust on the end blank in the holder when said end blank is first engaged by the threading mechanism B of the machine. The chute or trough F is preferably V-shaped in cross section, as shown in Figure 3, and it is adjustably mounted on the bolt holder C so that it can be moved towards and away from the plate 9 at the front end of said holder. In the form of my invention herein illustrated the trough F is mounted on the holder in such a manner that it can be adjusted simply by tilting the trough with relation to the holder and then moving it longitudinally of the holder, but it will, of course, be understood that it is immaterial what means is used for holding the trough F in adjusted position. As shown in Figures 1 and 2, the underside of the rear end portion of the holder C is substantially semi-circular-shaped and the trough F is provided with a sleeve F' that conforms to the cross-sectional shape of the rear end portion of the holder, as shown in Figure 3, said sleeve having a semi-circular-shaped under part that bears against the underside of the holder, and a substantially V-shaped top part that fits in the channel or guideway in the holder C. Said sleeve F' is arranged adjacent the front end of the trough F, and as the trough is of considerable length, the tendency of the rear end of the trough to drop downwardly causes the sleeve F' to cant, twist or bind on the portion of the holder on which it is slidingly mounted, and thus frictionally hold the trough F in adjusted position. If it is desired to change the position of the trough with relation to the holder it is only necessary to raise the rear end of the trough slightly so as to release the pressure of the sleeve F' on the holder and then move the trough into the desired position and release the rear end of same so that it can drop downwardly slightly, and thus cause the sleeve F' to bind against the portion of the holder which it surrounds.

The ejecting device can be arranged so that the plunger 1 of same either engages the head of the bolt or the shank of the bolt. Preferably, the ejecting device is adjustably mounted on the holder C so that it can be adjusted towards and away from the end plate 9 of the holder. One convenient way of accomplishing this is to connect the cylinder D of the ejecting device to a plate 11 slidingly mounted in guides 12 on the holder C and adapted to be clamped in adjusted position by means of a set screw 13 or other suitable retaining device. Such a construction permits the cylinder of the ejecting device to be arranged either in close proximity to the end plate 9 of the holder, as shown in Figure 5, or some distance in front of said end plate, as shown in Figure 1, thus making it possible to easily adjust the ejecting device to adapt it to long or short bolts. It is immaterial how the holder C is mounted on the carriage A of the machine, but I prefer to provide the holder with a hollow cylindrical portion 14 at the front end of same that is adapted to be clamped in jaws 15 on the bed plate A of the machine, as shown in Figure 4. In order that the time of operation of the plunger 1 of the ejecting device may be varied, I mount the tripping device 5 in such a way that it can be adjusted in various positions. Thus as shown in Figure 4, the stud 7 on which the tripping device 5 is supported is adjustably mounted in a horizontally-disposed, elongated slot 16 on the bed plate 17 of the machine. When the machine is in operation the operator in charge of the machine, who stands at the rear end of the trough F, places the bolt blanks in said trough, as shown in Figure 1, with the shanks of the blanks projecting forwardly, and with the heads of the blanks bearing against the V-shaped portion of said trough. A slight downward and forward pressure on the blank at the rear end or upper end of the trough causes the string of blanks to be pressed one against the other with the shank of the blank in the front end of the holder C positioned horizontally in longitudinal alignment with the threading mechanism B of the machine. When the carriage A moves forwardly the blank in the front end of the holder C is engaged by the threading mechanism B, and after said blank has been threaded, the carriage A moves in the reverse direction back to its former position. On the forward stroke of the carriage the tripping device 5 swings downwardly without effecting a change in the position of the valve E, but on the return stroke of the carriage the shoulder 5ª on the device 6 that is connected to the stem of the valve strikes against the upper end of the tripping device 5, thus causing the valve E to open and admit compressed air or any other suitable operating medium to the cylinder D of the ejecting device, so as to actuate the plunger 1 and cause said plunger to eject the bolt upwardly and laterally from the holder C. As soon as the finished bolt has been ejected from the holder the next bolt blank in the holder moves forwardly, due to the pressure that is exterted on same by the string of bolt blanks which the operator feeds through the trough F. As it is not necessary to clamp each bolt blank in the holding device preparatory to the threading operation and release each bolt blank and remove it manually from the holding device at the completion of the threading operation, the machine can be operated at a materially higher speed than is the usual custom. Accordingly, my invention effects a considerable saving in the operation of machines that are used for threading or pointing bolt blanks or machining other similar small articles. The holder C is of such design that it insures accurate alignment of the blanks with the threading mechanism or other part that operates on the blanks, and as the trough F is adjustably mounted on the holder, the holder can be adjusted easily to adapt it to blanks of different lengths. The time of operation of the plunger 1 of the ejecting device can be changed by varying the position of the tripping device 5 and the position of said plunger with relation to the holder can be changed easily so as to adapt it to long or short bolts or cause it to strike the bolt at a particular point.

Having thus described my invention, what I claim as new and desire to secure by Letters Patent is:

1. In a machine of the character referred to, a mechanism for acting on a blank, a holder for receiving and maintaining a blank in longitudinal alignment with said mechanism, and an automatic means for positively ejecting the blank from said holder sidewise or laterally, after the blank has been acted upon by said mechanism.

2. A bolt threading machine, comprising a threading mechanism, a reciprocating carriage that moves towards and away from said mechanism, a holder on said carriage for supporting a bolt blank, and means for automatically ejecting the bolt from said holder during the return stroke of the carriage.

3. In a machine of the character referred to, a holder for supporting the article to be operated on, an ejecting device comprising a cylinder equipped with a plunger for discharging the article from said holder, and an automatically operating means for admitting an operating medium to said cylinder.

4. In a machine of the character referred to, a holder for supporting the article to be operated on, an ejecting device comprising a cylinder provided with a plunger for discharging the article from said holder, a spring that normally holds said plunger retracted, and an automatically operating means for admitting an operating medium to said cylinder so as to actuate said plunger.

5. A bolt machine provided with a reciprocating carriage equipped with a holder for supporting a bolt blank, an ejecting device on said carriage comprising an element that is adapted to engage the bolt and discharge it from said holder, and an automatic means for causing said element to operate during the return stroke of said carriage.

6. A bolt machine provided with a carriage, a holder on said carriage for supporting a bolt blank, a cylinder on said carriage provided with an element that is adapted to strike the bolt and discharge it from the holder, and means for admitting an operating medium to said cylinder.

7. A bolt machine provided with a carriage, a holder on said carriage for supporting a bolt blank, a cylinder on said carriage provided with an element that is adapted to strike the bolt and discharge it from the holder, a valve for admitting an operating medium to said cylinder, and means for causing said valve to operate automatically during the return stroke of the carriage.

8. In a machine of the character described, a holder constructed to receive a bolt blank or similar article that is arranged loosely in said holder with its shank inclined downwardly and projecting towards the mechanism that operates on the blank, and surfaces on said holder that are adapted to co-operate with the head of the blank to hold the shank of the blank in longitudinal alignment with said mechanism when the head of the blank is subjected to a forward thrust.

9. In a machine of the character described, a holder constructed to receive a bolt blank or similar article that is arranged loosely therein with the shank of the blank inclined downwardly and projecting forwardly, and a slotted or bifurcated part at the front end of said holder that co-operates with the head of the blank to swing the shank of the blank upwardly into longitudinal alignment with the mechanism that operates on the blank when the head of the blank is subjected to a forward thrust.

10. In a machine of the character described, a holder having a guideway or channel through which a plurality of longitudinally-aligned bolt blanks or similar articles can be fed endwise to arrange them in proper position with relation to a mechanism that acts on the blanks, and means adapted to engage the underside of the head of the front blank in the holder and maintain said blank in alignment with said mechanism when the head of said front blank is subjected to a forward thrust.

11. In a machine of the character described, a holder having a channel or guideway in which bolt blanks or similar articles can be loosely arranged in longitudinal alignment, with the shanks of the blanks projecting forwardly, and a slotted or bifurcated part at the front end of the holder adapted to receive the forwardly-projecting shank of the front blank and co-operate with the head of said blank to hold the shank in a horizontal position when said front blank is subjected to a forward thrust.

12. In a machine of the character described, a holder in which bolt blanks or similar articles can be loosely arranged, one behind the other, with the shanks of the blanks projecting forwardly, and a chute on said holder for holding the blanks that are being fed endwise into said holder.

13. In a machine of the character described, a holder provided with a channel or guideway in which a plurality of bolt blanks or similar objects are adapted to be arranged with their shanks projecting forwardly, means at the front end of said holder that co-operates with the head of the end blank to properly position said end blank, and a chute mounted on said holder, for the purpose described.

14. In a machine of the character described, a holder provided with a channel or guideway in which a plurality of bolt blanks or similar objects are adapted to be arranged with their shanks projecting forwardly, means at the front end of said holder that co-operates with the head of the end blank to properly position said end blank, and an inclined trough mounted on said holder in such a manner that the tendency of the rear end of the trough to move downwardly causes the trough to be retained in adjusted position on the holder.

15. In a machine of the character described, a holder provided with a channel or guideway in which a plurality of bolt blanks or similar objects are adapted to be arranged with their shanks projecting forwardly, means at the front end of said holder that co-operates with the head of the end blank to properly position said end blank, and an inclined trough provided with a portion that is retained in frictional engagement with said holder by the tendency of the trough to assume a horizontal position.

16. In a machine of the character described, a holder having a guideway or channel through which bolt blanks or similar objects can be fed longitudinally, and an inclined trough provided with a portion slidingly mounted on said holder and constructed in such a way that it normally binds against the holder with sufficient pressure to hold the trough in adjusted position.

17. A bolt machine provided with a holder in which a bolt blank is adapted to be loosely arranged with a shank of the blank projecting forwardly, a mechanism for acting on said shank, and means for automatically ejecting the bolt from said holder after it has been acted upon by said mechanism.

18. A bolt machine provided with a holder adapted to have a bolt blank loosely arranged therein with the shank of the blank projecting forwardly, a mechanism for acting on said blank, means on said holder that co-operates with the head of the blank to hold the shank in longitudinal alignment with said mechanism, and means for automatically ejecting the bolt from said holder after it has been operated on by said mechanism.

19. A bolt machine provided with a holder having a channel or guideway for receiving a plurality of bolt blanks arranged end to end, a mechanism arranged in front of said holder for acting on the blanks, means on the holder that co-operates with the head of the end blank to hold the shank of said end blank in longitudinal alignment with said mechanism, and an automatic ejecting device for discharging the bolts from said holder.

20. A bolt machine provided with a reciprocating carriage, a holder on said carriage in which bolt blanks can be arranged with their shanks projecting forwardly, a slotted or bifurcated part at the front end of said holder through which the shank of the end blank projects, and an automatic ejecting device that is adapted to engage the end blank and discharge it from said holder.

21. A bolt machine provided with a reciprocating carriage, a holder on said carriage provided with an open channel or guideway in which a plurality of bolt blanks can be arranged end to end, means at the front end of said holder that co-operates with the head of the end blank to hold the shank of said end blank in longitudinal alignment with the mechanism that operates on same, an ejecting device on said carriage for discharging the finished bolts from the holder, and means for causing said ejecting device to operate automatically during the return stroke of the carriage.

22. A bolt machine provided with a reciprocating carriage, a holder on said carriage provided with surfaces that co-operate with the head of a bolt blank loosely arranged in said holder to hold the shank of said blank in proper position with relation to the mechanism that acts on same, a cylinder on said carriage provided with a plunger that is adapted to engage the bolt and discharge it from said holder, and means for admitting an operating medium to said cylinder.

23. A bolt machine provided with a reciprocating carriage, a holder on said carriage provided with surfaces that co-operate with the head of a bolt blank loosely arranged in said holder to hold the shank of said blank in proper position with relation to the mechanism that acts on same, a cylinder on said carriage provided with a plunger that is adapted to engage the bolt and discharge it from said holder, a valve for admitting an operating medium to said cylinder, and means for actuating said valve automatically during the return stroke of the carriage.

24. A bolt machine provided with a carriage, a holder on said carriage provided with an open channel or guideway in which bolt blanks can be arranged end to end, a part on said holder having an open ended slot through which the shank of the end blank projects forwardly, said end blank being adapted to be properly positioned by exerting a thrust on the rear end of same so as to hold the head of said end blank in engagement with the slotted part on the holder, and an automatic ejecting device on said carriage that is adapted to engage the end blank and discharge it from the holder during the return stroke of the carriage.

25. A bolt machine provided with a carriage, a holder on said carriage provided with an open channel or guideway in which bolt blanks can be arranged end to end, a part on said holder having an open ended slot through which the shank of the end blank projects forwardly, said end blank being adapted to be properly positioned by exerting a thrust on the rear end of same so as to hold the head of said end blank in engagement with the slotted part on the holder, an automatic ejecting device on said carriage that is adapted to engage the end blank and discharge it from the holder during the return stroke of the carriage, and a chute or trough on said holder for receiving bolt blanks that are being fed into the guideway of said holder.

26. A bolt machine, comprising a reciprocating carriage, a holder on said carriage in which bolt blanks can be arranged end to end and fed forwardly towards the mechanism which acts on the blanks, said holder being so constructed that the end blank can be discharged therefrom by a side blow, an ejecting device on said carriage comprising a cylinder and a plunger in said cylinder, a valve for admitting an operating medium to said cylinder, and a tripping device that causes said valve to act automatically during the return stroke of the carriage.

SAMUEL B. CLAY.